United States Patent [19]
Ishikawa et al.

[11] Patent Number: 5,971,441
[45] Date of Patent: Oct. 26, 1999

[54] RUST-RESISTANT SLEEVE FOR USE IN A BRANCH HOLE OF A WATER PIPELINE

[75] Inventors: Kazuo Ishikawa; Yasushige Otani, both of Osaka, Japan

[73] Assignee: Tabuchi Co., Ltd., Osaka, Japan

[21] Appl. No.: 09/129,692

[22] Filed: Aug. 5, 1998

[30] Foreign Application Priority Data

Aug. 12, 1997 [JP] Japan .................................. H9-231706

[51] Int. Cl.⁶ ....................................................... F16L 9/14
[52] U.S. Cl. .................... 285/55; 285/197; 285/382.4; 285/422; 285/906; 285/925; 277/934
[58] Field of Search .................................. 285/197, 198, 285/199, 382.4, 55, 382.5, 925, 906, 422; 277/934

[56] References Cited

U.S. PATENT DOCUMENTS

| | | | |
|---|---|---|---|
| 2,445,273 | 7/1948 | Kennedy | 285/925 X |
| 2,449,616 | 9/1948 | Pennella | 285/925 X |
| 3,951,438 | 4/1976 | Scales | 285/55 |
| 4,558,875 | 12/1985 | Yamaji et al. | 277/934 X |
| 4,613,171 | 9/1986 | Corcoran | 285/197 |
| 5,817,713 | 10/1998 | Pappas et al. | 524/521 |

FOREIGN PATENT DOCUMENTS

| | | |
|---|---|---|
| 2554797 | 5/1995 | Japan . |
| 8-14480 | 1/1996 | Japan . |

*Primary Examiner*—Dave W. Arola
*Attorney, Agent, or Firm*—Thompson Hine & Flory LLP

[57] ABSTRACT

A rust-resistant cylindrical metal sleeve for preventing rust and corrosion from developing around the wall of a branch hole when the sleeve is rigidly fitted into a branch hole that is drilled through the wall of a metal conduit such as a water pipeline. The sleeve has a projecting portion on its outer circumference and an inner flange portion inwardly projecting at its lower end. The metal sleeve on its outer circumference is coated with a water-absorbing swelling rubber into which a synthetic resin rubber and a water-absorbing polymer are blended. Preferably, 100 parts by weight of styrene-butadiene rubber or ethylene-propylene-dienemetylene linkage rubber is blended with 10 to 40 parts by weight of the water-absorbing polymer. Since the water-absorbing swelling rubber increases its volume as it absorbs water, pressure in the rubber increases, preventing water ingress through between the metal sleeve and the wall of the branch hole.

7 Claims, 1 Drawing Sheet

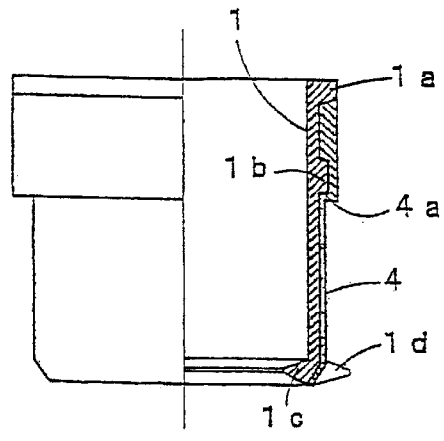
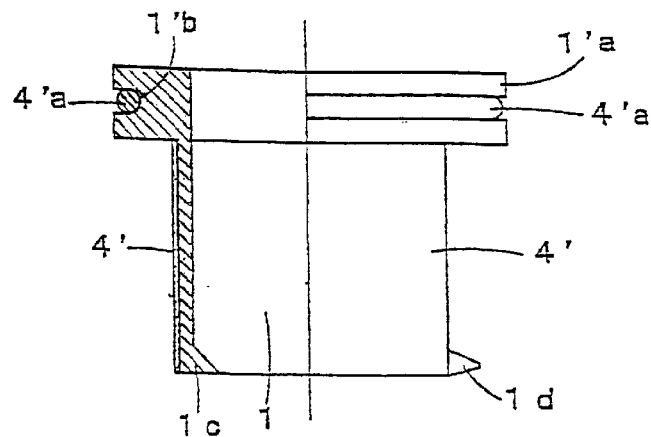
FIG. 1A  FIG. 1B
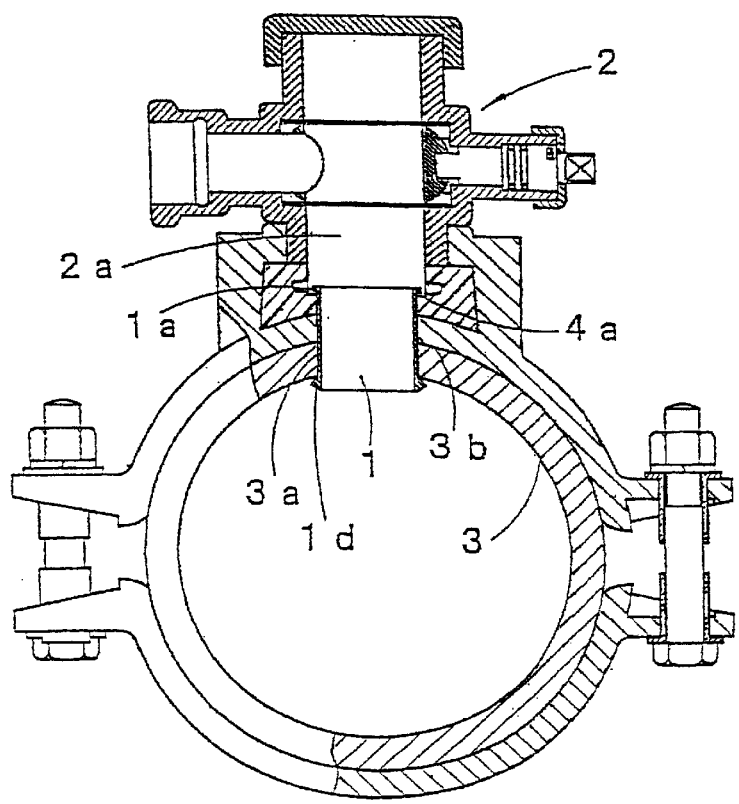
FIG. 2

RUST-RESISTANT SLEEVE FOR USE IN A BRANCH HOLE OF A WATER PIPELINE

BACKGROUND OF THE INVENTION

1. Field of the Invention

The present invention chiefly relates to a rust-resistant sleeve that prevents rust and corrosion from developing around the wall of a branch hole when the sleeve is rigidly fitted into the branch hole that is drilled through the wall of a metal conduit such as a water pipeline.

2. Description of the Related Art

A rust-resistant sleeve is known and in widespread use in water supply systems. Such a rust-resistant sleeve is fitted into a branch hole drilled into the wall of a water pipeline to attain rust and corrosion resistance in the inner surface of the pipeline.

Many of these rust-resistant sleeves are metal sleeves made of copper (phosphor-deoxidized copper), stainless steel or the like, and are directly fitted into a branch hole drilled into the wall of a water pipeline. When the sleeve is installed into the pipeline, undue force may work on the sleeve, causing it to be deformed. Such a deformation creates an insufficient contact between the inner wall of the branch hole and the metal sleeve, thereby causing the sleeve to fail to achieve a good rust resistance performance. In a preventive step, the outer circumference of the metal sleeve is coated with an elastic member such as synthetic rubber.

Since the water pipeline presents naturally a high moisture and splashy environment, the elastic member has preferably a water absorption property to prevent rust development. Conventionally available high-water-absorption materials such as starch-acrylic ester graft, cross-linked carboxymethyl-cellulose, and cross-linked polyvinyl alcohol are used in agriculture fields (for example for soil improvements in water retaining property), in sanitation and medical fields.

A water absorbing rubber into which one of these high-water-absorption resins and SBR (styrene-butadiene rubber) or EPDM (ethylene-propylene-dienemetylene linkage) rubber are blended is occasionally used in civil engineering fields and building construction as dehydrating or sealing compound.

Even if the metal sleeve is covered or coated with an elastic member such as the above rubber for rust resistance, the elasticity of the rubber only serves the contact between the sleeve and the inner wall of the branch hole. To fit the sleeve into the branch hole, the sleeve has to be partly or uniformly expanded in diameter to press firmly the rubber around the circumference of the sleeve, against the inner wall of the branch hole, using a stretching tool. When the deformation of the metal sleeve becomes irregular during the cut and expansion step, an undue external force may destroy partly the rubber, and rust resistance performance is thus degraded.

SUMMARY OF THE INVENTION

Accordingly, it is an object of the present invention to resolve the above problem. To achieve this object, the present invention takes advantage of the fact that the water absorbing rubber, used as a water absorbing compound and dehydrating compound in agriculture, medical, civil engineering and building construction fields, substantially increases its volume as it absorbs water. Specifically, a water-absorbing swelling capability is imparted to the elastic member such as a rubber coating the external circumference of the conventional metal sleeve. As the rubber that remains in contact with water increases in volume, the tightness is assured between the sleeve and the wall of the branch hole.

More specifically, the metal sleeve has a projecting portion on its outer circumference, and an inner flange portion inwardly projecting at its lower end. The metal sleeve is coated with a water-absorbing swelling rubber into which a water-absorbing polymer and a synthetic resin rubber are blended. Preferably, the water-absorbing swelling rubber is produced by blending 100 parts by weight of a rubber material such as SBR or EPDM and 10 to 40 parts by weight of a water-absorbing resin (polymer).

An outer flange is formed at the upper end of the metal sleeve, and the outer circumference of the metal sleeve, extending from the underside of the outer flange, is coated with the water-absorbing swelling rubber.

These and other objects, features and advantages of the invention will become more apparent upon a reading of the following detailed specification and drawings.

BRIEF DESCRIPTION OF THE DRAWINGS

FIGS. 1A and 1B are front views of a rust-resistant sleeve with its half portion cut away; and FIG. 2 is a cross-sectional view showing a major portion of a saddle-type branch stop with its rust-resistant sleeve mounted on a water pipeline.

DESCRIPTION OF THE PREFERRED EMBODIMENTS

FIGS. 1A and 1B show a preferred embodiment. A hollow, cylindrical metal sleeve 1 is made of a rust-resistant metal such as a phosphor-deoxidized copper or stainless steel. The rust-resistant metal sleeve has a flange portion 1a that is slightly projected radially outwardly from the top edge of the metal sleeve and a projecting portion 1b on its outer circumference below the flange portion 1a. As seen from FIG. 1A, the projecting portion 1b with the water-absorbing swelling rubber 4 attached on it is engaged with a lower passage 2a of a branch stop 2 and the projecting portion 1b on its lower side has a diameter that is engaged with a branch hole 3a drilled in the wall of a water pipeline 3. A step portion 4a of the metal sleeve is engaged with the periphery 3b of the branch hole 3a.

FIG. 1B shows another embodiment of the rust-resistant sleeve of the present invention. The material and principal dimensions, such as inner and outer diameters, of the metal sleeve 1 remain unchanged from those in the metal sleeve 1 shown in FIG. 1A. The metal sleeve 1 has a flange portion 1'a at its upper side. The flange portion 1'a has a circular groove 1'b running circularly around at its axial center. The water-absorbing swelling rubber ring 4'a is seated in the groove 1'b, and a water-absorbing swelling rubber coating 4' of a constant thickness covers the outer circumference of the metal sleeve 1 below the underside of the projecting flange portion 1'a.

In the two metal sleeves 1 shown in FIGS. 1A and 1B, an inner projecting flange portion 1c having a triangular shape in cross section is integrally formed with the inside of the lower end of the metal sleeve 1. As a stretching tool (not shown) is inserted into the metal sleeve 1, the end of the tool presses outwardly the inner flange portion 1c until the flange portion 1c projects radially outwardly, forming a bent portion 1d. The bent portion 1d is engaged with the inner surface of the water pipeline at the periphery of the branch hole 3a.

The water-absorbing swelling rubber 4 is attached to cover the outer circumference of the metal sleeve 1 through a baking or gluing process. The thickness of the rubber 4 is typically within a range of 0.5 mm to 1.5 mm, though no particular limitation is set in the thickness of the rubber 4. Referring to FIG. 2, 4a designates a step portion.

The function of the water-absorbing swelling rubber 4 is not to remove ambient moisture by absorbing water collecting thereon but to exert an increase, in pressure in the water-absorbing swelling rubber 4 when it swells in volume with water absorption, on the circumference of the metal sleeve 1, namely, against the inner wall of the lower passage 2a of the branch stop 2 and against the inner wall of the branch hole 3a. The water-absorbing swelling rubber in the present invention is produced by blending of the rubber material and the water-absorbing resin, for example, by blending 100 parts by weight of the rubber material 100 such as SBR or EPDM and 10 to 40 parts by weight of one selected from, or a mixed polymer of two or more selected from the group consisting of starch-acrylic ester graft, cross-linked carboxymetyl-cellulose, cross-linked polyvinyl alcohol, and isobutylene-maleic anhydride-polymer, these being known as water-absorbing polymers. The material of the water-absorbing polymer is not limited to these polymers.

The reason the water-absorbing polymer is set to be within a range of 10 to 40 parts by weight is as follows. If the water-absorbing polymer is below 10 parts by weight, the water-absorption swelling rate is substantially lowered though the physical properties (such as tensile strength) of the rubber are prevented from being degraded. If the water-absorbing polymer is above 40 parts by weight, the water-absorbing swelling rate is accordingly heightened while the physical properties are substantially degraded. When the degradation of the physical properties is not a prime concern, the water-absorbing polymer may be set to be above 40 parts by weight.

The rust-resistant sleeve of the present invention is mounted in the branch hole of the water pipeline as follows. A drill is used to open a predetermined branch hole in the wall of the water pipeline with the saddle-type branch stop attached in a manner similar to the conventional method. After the drill is pulled out, the rust-resistant sleeve is inserted through the passage of the branch stop to a predetermined position. A stretching tool is used to open wide the inner flange portion at the lower end of the metal sleeve. This completes the mounting operation of the metal sleeve. The water-absorbing swelling rubber swells with water absorption and expands in volume in a radial direction. The rubber layer is tightened between the metal sleeve and the lower passage of the branch stop and the inner wall of the branch hole, permitting no water ingress therebetween and thereby serving the rust resistance purpose.

Because of its water-absorbing swelling feature, the water-absorbing swelling rubber layer fills the gap between the sleeve and the inner wall of the branch hole. The clearance between the metal sleeve and each of the lower passage of the branch stop and the inner wall of the branch hole is designed to be small but still large enough to pass the metal sleeve with the rubber layer through the lower passage of the branch stop and the inner wall of the branch hole. Since only force exerted on the metal sleeve is the one required to press open the sleeve lower flange outwardly in the installation after the insertion of the metal sleeve, the installation is efficiently made. The metal sleeve of this invention is thus free from waste material and water leakage arising from a deformation of a metal sleeve and damage to a rubber layer, encountered in the conventional art. The metal sleeve of the present invention is thus highly reliable.

What is claimed is:

1. A rust-resistant cylindrical metal sleeve for use in a branch hole of a metal pipeline, comprising a projecting portion on the outer circumference of said metal sleeve and a flange portion projecting inwardly at one end of said metal sleeve, and a water-absorbing swelling rubber coating the outer circumference of said metal sleeve, wherein said water-absorbing swelling rubber is a blend of a synthetic resin rubber material and a water-absorbing polymer.

2. A rust-resistant cylindrical metal sleeve according to claim 1 further comprising a flange portion projecting outwardly at the other end of said metal sleeve, wherein the entire outer circumference of said metal sleeve below said outwardly projecting portion is coated with said water-absorbing swelling rubber.

3. A rust-resistant cylindrical metal sleeve according to claim 1, wherein only the outer circumference of said metal sleeve is coated with said water-absorbing swelling rubber.

4. A rust-resistant cylindrical metal sleeve according to claim 3, wherein said water-absorbing swelling rubber has a constant thickness.

5. A rust-resistant cylindrical metal sleeve according to claim 1, wherein said synthetic resin rubber is styrene-butadiene rubber.

6. A rust-resistant cylindrical metal sleeve according to claim 1, wherein said synthetic resin rubber is ethylene-propylene-dienemetylene linkage rubber.

7. A rust-resistant cylindrical metal sleeve according to claim 1, wherein said water-absorbing swelling rubber is obtained by blending 100 parts by weight of a synthetic resin rubber with 10 to 40 parts by weight of a water-absorbing polymer.

* * * * *